United States Patent
Li et al.

(10) Patent No.: US 10,447,085 B2
(45) Date of Patent: Oct. 15, 2019

(54) INTEGRATED CIRCUIT-BASED WIRELESS CHARGING SYSTEM AND METHOD

(71) Applicant: Shenzhen Yichong Wireless Power Technology Co., Ltd., Shenzhen, Guangdong (CN)

(72) Inventors: Jie Li, Chengdu (CN); Siming Pan, San Jose, CA (US); Tun Li, San Jose, CA (US); Dawei He, Burlingame, CA (US)

(73) Assignee: SHENZHEN YICHONG WIRELESS POWER TECHNOLOGY CO. LTD, Shenzhen (CN)

( * ) Notice: Subject to any disclaimer, the term of this patent is extended or adjusted under 35 U.S.C. 154(b) by 224 days.

(21) Appl. No.: 15/483,087

(22) Filed: Apr. 10, 2017

(65) Prior Publication Data

US 2018/0294671 A1    Oct. 11, 2018

(51) Int. Cl.
| | |
|---|---|
| H01F 38/14 | (2006.01) |
| H02J 50/12 | (2016.01) |
| G05F 5/00 | (2006.01) |
| H02H 7/12 | (2006.01) |
| H02H 7/20 | (2006.01) |

(52) U.S. Cl.
CPC ............... *H02J 50/12* (2016.02); *G05F 5/00* (2013.01); *H02H 7/1213* (2013.01); *H02H 7/20* (2013.01)

(58) Field of Classification Search
CPC ......... H02J 50/12; H02H 7/20; H02H 7/1213; G05F 5/00
See application file for complete search history.

(56) References Cited

U.S. PATENT DOCUMENTS

| | | | |
|---|---|---|---|
| 2005/0174813 A1* | 8/2005 | Dou | H02M 3/33592 363/59 |
| 2006/0119322 A1* | 6/2006 | Maleki | H01M 10/486 320/150 |
| 2011/0127951 A1* | 6/2011 | Walley | H02J 7/025 320/108 |
| 2011/0241625 A1* | 10/2011 | LoCascio | H02J 7/0052 320/140 |
| 2014/0265935 A1* | 9/2014 | Sadwick | H05B 33/0815 315/307 |
| 2014/0268905 A1* | 9/2014 | Reddy | H02M 1/4225 363/21.02 |
| 2015/0249384 A1* | 9/2015 | Liu | H02M 3/158 323/271 |
| 2015/0365001 A1* | 12/2015 | Klesyk | H02M 1/08 363/21.01 |
| 2017/0018948 A1* | 1/2017 | Tseng | H02J 7/025 |

(Continued)

*Primary Examiner* — Alfonso Perez Borroto
*Assistant Examiner* — Esayas G Yeshaw
(74) *Attorney, Agent, or Firm* — Sheppard Mullin Richter & Hampton LLP

(57) ABSTRACT

An integrated circuit for wireless power transfer is disclosed. The integrated circuit may comprise a boost controller configured to pump up a system input to a DC input, an oscillator configured to generate a frequency signal, a MOS (metal-oxide-semiconductor) driver coupled to the oscillator, and a power switch coupled to the MOS driver. The MOS driver may be configured to receive the frequency signal and drive the power switch to convert, based on the frequency signal, the DC input to an AC input to a resonant circuit connected to the integrated circuit.

18 Claims, 3 Drawing Sheets

(56) References Cited

U.S. PATENT DOCUMENTS

2017/0085106 A1* 3/2017 Bai .................... H02J 7/0052
2017/0133880 A1* 5/2017 Wakisaka ................ H02J 50/80
2018/0062430 A1* 3/2018 Matsumoto ............... H02J 7/00

* cited by examiner

INTEGRATED CIRCUIT-BASED WIRELESS CHARGING SYSTEM AND METHOD

TECHNICAL FIELD

The present disclosure relates generally to wireless charging methods and systems based on integrated circuits (IC).

BACKGROUND

Wireless power transfer is a developing technology that may revolutionize millions of electronic devices by transferring energy through a time-varying electromagnetic field. Electric toothbrush is one of such devices that have adopted the new technology for the benefits of preventing electromigration, corrosion, and potential electric shorts in humid environments.

Most conventional electric toothbrushes consist of a power transfer/transmitter unit and a power receiver unit, which are inductively coupled to each other through coils. Most power transfer unit designs use discrete components to construct functional blocks. These discrete components may substantially add up the design cost and complexity. Further, the power transfer unit has to be large enough to enclose all the components, making compact designs difficult.

SUMMARY

One aspect of the present disclosure is directed to an integrated circuit for wireless power transfer. The integrated circuit may comprise a boost controller configured to pump up a system input to a DC input, an oscillator configured to generate a frequency signal, a MOS (metal-oxide-semiconductor) driver coupled to the oscillator, and a power switch coupled to the MOS driver. The MOS driver may be configured to receive the frequency signal and drive the power switch to convert, based on the frequency signal, the DC input to an AC input to a resonant circuit connected to the integrated circuit.

Another aspect of the present disclosure is directed to a system for wireless power transfer. The system may comprise a boost controller configured to pump up a system input to a DC input, an oscillator configured to generate a frequency signal, a MOS (metal-oxide-semiconductor) driver coupled to the oscillator, and a power switch coupled to the MOS driver. The MOS driver may be configured to receive the frequency signal and drive the power switch to convert, based on the frequency signal, the DC input to an AC input to a resonant circuit. The boost controller, the oscillator, and the driver may be assembled on an integrated circuit, and the resonant circuit may be connected to the integrated circuit.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Conventional wireless charging systems are designed with discrete electrical/electronic components. The disclosed systems and methods may mitigate or overcome one or more of the problems set forth above and/or other problems in the prior art, e.g., reduce cost, complexity, and size of electric toothbrushes and corresponding charging stations.

Figure 1:
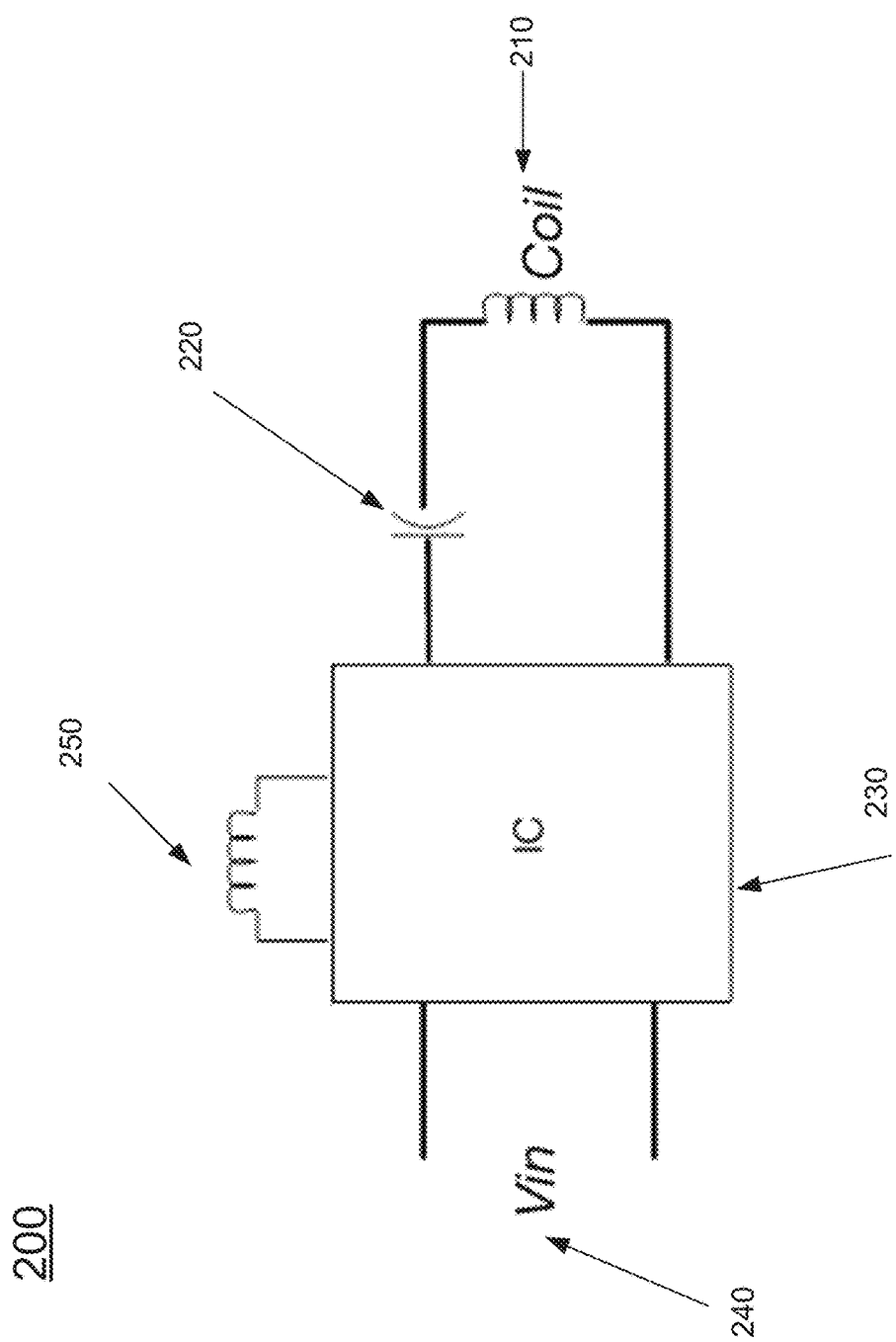
FIG. 1 is a diagram illustrating basic components of an IC-based wireless charging system, consistent with exemplary embodiments of the present disclosure.

FIG. 1 shows basic components of an IC-based wireless charging system 200, consistent with exemplary embodiments of the present disclosure. System 200 may be a high-level illustration, and details of the IC are described below with reference to FIG. 2. Power input is shown as Vin 240 and connects to an IC 230. From the IC 230, coil 210 and capacitor 220 connect in series to form a resonant or a LC circuit. The LC circuit may be tunable by the IC 230. The coil 210 and the capacitor 220 are further described below with reference to FIG. 2. The IC 230 may also connect to an inductor 250 described below with reference to FIG. 2. The LC circuit may act as an electrical resonator oscillating to create a changing in an electromagnetic field and wirelessly transferring energy to a receiver circuit. The LC circuit may oscillate at the circuit's resonant frequency. The IC 230 may also control other operations of the LC circuit, such as optimizing the wireless power transfer efficiency of the LC circuit.

Figure 2:
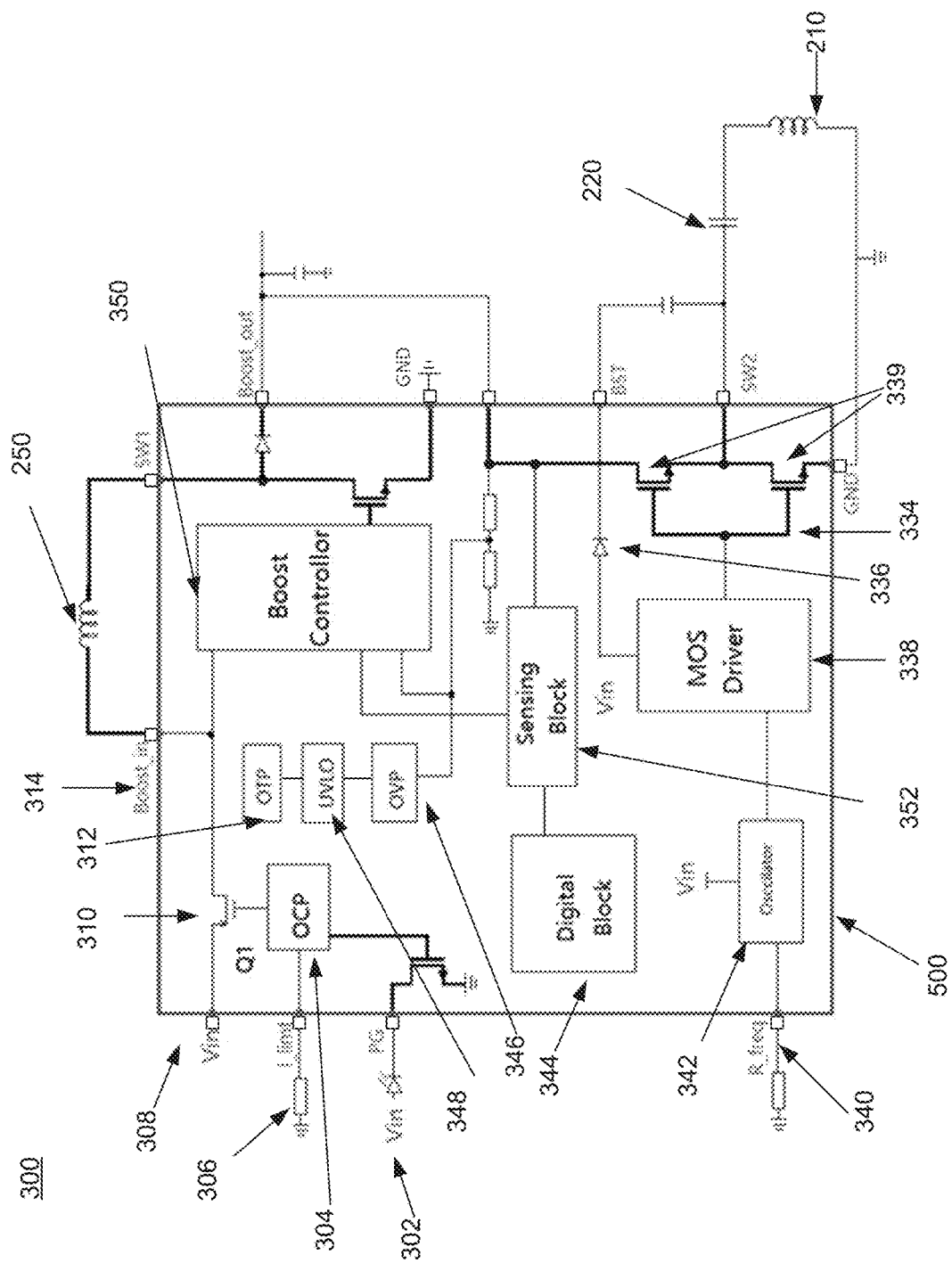
FIG. 2 is a diagram illustrating an IC-based wireless charging system, consistent with exemplary embodiments of the present disclosure.

FIG. 2 is a block diagram illustrating an IC-based wireless power transfer system 300, consistent with exemplary embodiments of the present disclosure. System 300 may comprise a number of components, some of which may be optional. One or more components shown in FIG. 2 may be assembled on an IC. As illustrated in FIG. 2, components within boundary 500, in the shape of a rectangle, may be assembled on the IC to perform the disclosed methods. Intersections of the boundary 500 with other lines are labelled in the figure in terms of the physical attributes, such as input voltage Vin, limiting current I_limit, and etc., and are described below. The wireless charging system 300 may receive a power input at Vin 302, 308. As shown in FIG. 2, the input Voltage Vin is coupled to Over Charge Current Protection (OCP) 304. The OCP circuit 304 is grounded using resistor 306. The other port for the input voltage Vin is at 308. The integrated circuit gets the power Vin which is controlled by the OCP 304 against large currents. When the OCP 304 detects the input current Iin over the current threshold, Q1 MOSFET switch 310 is turned off to protect the output. The input current limit I_limit is programmed with resistor 306 to ground.

In certain embodiments, the integrated circuit implements one or more of the protection circuits including, for example, an Over Temperature Protection circuit (OTP) 312 configured to detect a thermal overload (above a threshold), an Under-Voltage Lock Out (UVLO) circuit 348 configured to detect a voltage of Vin below a threshold, and an Over Voltage Protection circuit (OVP) 346 configured to detect an overshoot of a Boost_out voltage (above a threshold). With these protection circuits, the integrated circuit is protected against surges, thermal over loads, low regulation voltage and voltage overshoots. In case of such detections, the integrated circuit may turn off associated MOSFET switches to protect the components of the integrated circuit and any devices connected to the system through the integrated circuit. The integrated circuit in the protection turned-off mode may also indicate protection mode status at power ground (PG).

In some embodiments, the Boost_in 314 is the power coupled from the inductor 350 to the Boost Controller 350 for boosting voltages. The boost Controller 350 can pump up a system input (e.g., a low voltage Vin) to a DC input (e.g., a high voltage). The Boost Controller may supply the DC input to the power switch 334.

In some embodiments, the oscillator 342 is part of the integrated circuit. The oscillator 342 is used to generate a high frequency signal (e.g., in the order of MHz) to the MOS (metal-oxide-semiconductor) Driver block 338. The high frequency can help increase the effectiveness of wireless power transfer described below. The frequency of the oscillator 342 can be adjusted from resistor R_freq 340 to ground. The frequency output from the oscillator 342 is coupled to MOS driver 338 which drives the power switch 334 including one or more MOS 339. The output of the MOS 339 can be used to drive the LC Resonant circuit comprising capacitor 220 and coil 210. The power switch 334 may receive the DC input from Boost Controller 350 and convert the DC input to an AC signal for wireless power transfer at the LC circuit to charge different wireless devices with matching resonant receiver circuits. That is, the AC signal may cause the LC circuit to resonate and function as a wireless power transmitter.

In some embodiments, the digital block 344 may connect to the sensing block 352 and/or other components of system 300. The digital block 344 may be configured to to detect the system work status, according different status to adjust output power to achieve the optimized efficiency. For example, responsive to the DC input (e.g., the DC input's voltage) generated by the Boost Controller 350 exceeding a predetermined threshold, the digital block 344 may disable the Boost Controller 350 or otherwise cause the Booster Controller 350 to at least lower the DC input. For another example, the digital block 344 may couple to the LC circuit (including the capacitor 220 and the coil 210) and configured to detect a foreign object, such as a wireless power receiver. Since the LC circuit may function as a wireless power transmitter, when a wireless power receiver's coil is placed close to the LC circuit's coil, coil-to-coil magnetic coupling would generate a signal at the LC circuit to be detected by the digital block 344. When a wireless power transfer is performed between the LC circuit and the wireless power receiver, the digital block 344 may monitor the wireless power transfer status and communicate with the wireless power receiver (e.g., via coil-to-coil load modulation, WiFi, Bluetooth, etc.).

In some embodiments, the sensing block 352 may sense the output voltage of the boost (from the boost controller 350) and an associated current of boost output to get the impedance. When there are no devices being charged, the impedance is low. When there are devices being charged, the impedance is high. The sensing block 352 can give feedback to the Boost Controller 350 to adjust the current of system 300 accordingly. For example, responsive to the DC input (e.g., the DC input's voltage or current) generated by the Boost Controller 350 exceeding a predetermined threshold, the sensing block 352 may disable the Boost Controller 350 or send the feedback to cause the Booster Controller 350 to at least lower the DC input. When the current usage is optimized, the efficiency is good. When the efficiency is not good, the boost controller will adjust the Boost_out based on a lookup table. The power transmitter from the LC resonant circuit using capacitance 220 and coil 210 will accordingly tune to the adjusted voltage. When the efficiency is good, the boost controller does not adjust the Boost_out, the integrated circuit will record the system parameters and begin the next detection using the sensing block 352 and the digital block 344.

In some embodiments, the MOS driver 338 may control the power MOS 339 on/off to adjust boost output voltage based on the lookup table and sensing block. In certain embodiments, the LC resonant circuit transmits zero power, a fraction of a maximum working power of the system 300 or the maximum working power.

Figure 3:
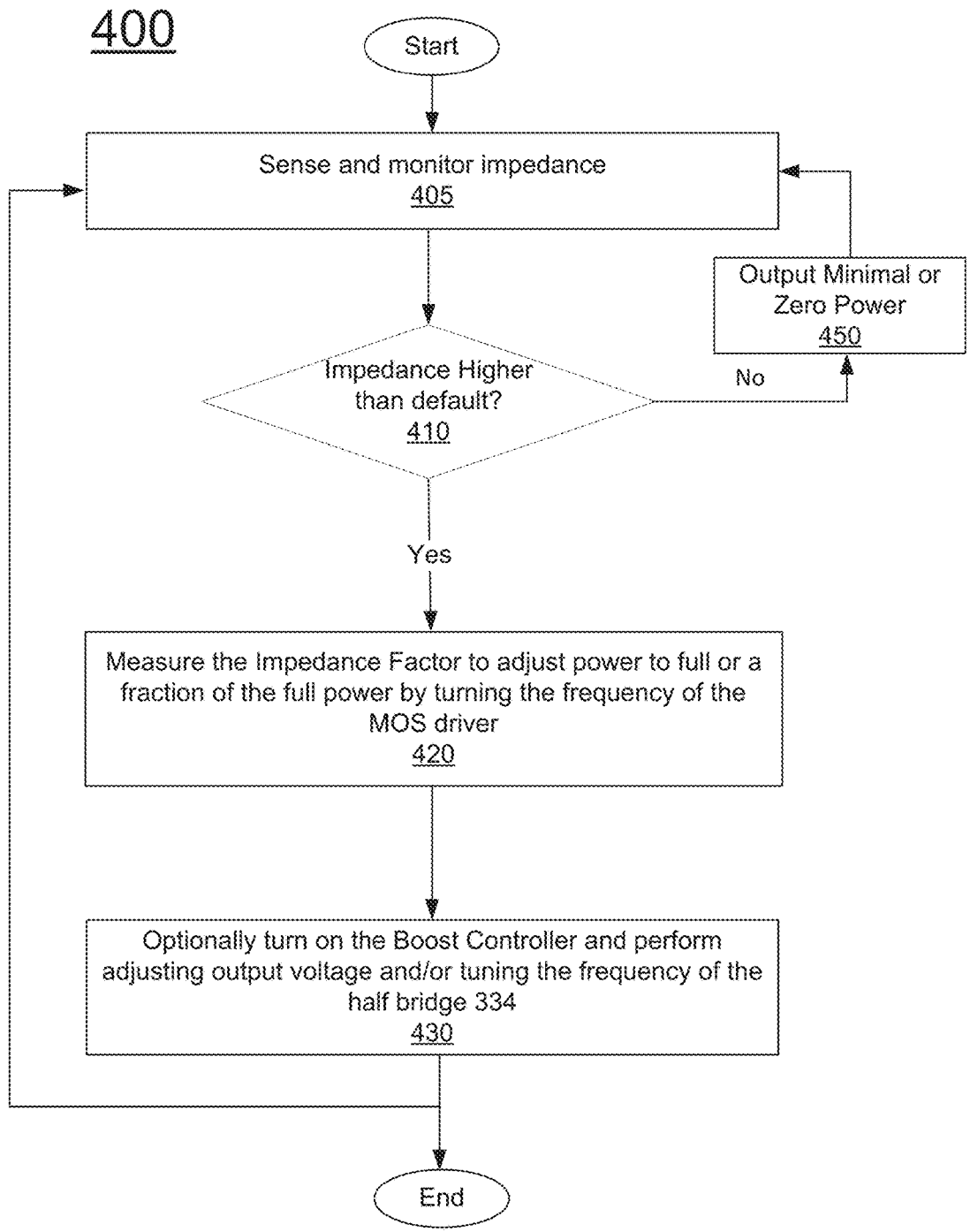
FIG. 3 is a flowchart illustrating a method for wirelessly charging electric devices, consistent with exemplary embodiments of the present disclosure.

FIG. 3 is a flowchart illustrating a method 400 for wireless electrical charging, consistent with exemplary embodiments of the present disclosure. Method 400 may be implemented by an IC-based system such as system 200 and system 300. Method 400 may include a number of steps, some of which may be optional. The steps may also be rearranged in another order. For example, steps 420 and 430 may be performed in either order or concurrently.

In Step 405, one or more components of the wireless charging system 200 or 300 sense and monitor the impedance of the integrated circuit. Impedance is higher when multiple chargeable electric devices are placed for charging. In Step 410, the decision of whether impedance is higher than a default level is examined. If impedance is at the default level, a chargeable electric device is not found, in Step 450, the wireless charging system 300 conserves power by outputting minimal or zero power from the LC resonant circuit. If a chargeable electric device is found, the impedance will be higher than the default levels, one or more components of the wireless charging system 300 are enabled for operation. In step 420, the impedance is measured and power of the LC resonant circuit is adjusted to full power (e.g., the maximum working power of system 300) or a fraction of the full power by tuning the frequency of the MOS driver 338. In some embodiments, at optional step 430, the boost controller may be turned on, and the output voltage and/or frequency of the half bridge (power switch 334 including MOS 339) may be tuned. For example, the input voltage supplied to the half bridge may be stepped up from 5 volts to 12 volts based on the boost controller tuning. In certain embodiments, the sensing is performed periodically. Optionally, the time period between two sense detections can be adjusted based on desired wireless charging sensitivity by the user.

Another aspect of the disclosure is directed to a non-transitory computer-readable storage medium storing instructions which, when executed, cause one or more processors to perform the method, as discussed above. The computer-readable storage medium may include volatile or non-volatile, magnetic, semiconductor, tape, optical, removable, non-removable, or other types of computer-readable storage medium or computer-readable storage devices. For example, the computer-readable storage medium may be the storage unit or the memory module having the computer instructions stored thereon, as disclosed. In some embodiments, the computer-readable storage medium may be a disc or a flash drive having the computer instructions stored thereon.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for wirelessly charging electric devices. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. An integrated circuit for wireless power transfer, comprising:
   a boost controller configured to pump up a system input to a DC input;
   an oscillator configured to generate a frequency signal, wherein the oscillator is connected to an external resistor configured to adjust the frequency signal;
   a MOS (metal-oxide-semiconductor) driver coupled to the oscillator; and
   a power switch coupled to the MOS driver, wherein the MOS driver is configured to receive the frequency signal and drive the power switch to convert, based on the frequency signal, the DC input to an AC input to a resonant circuit connected to the integrated circuit.

2. The integrated circuit of claim 1, wherein the resonant circuit is wirelessly coupled to another resonant circuit for wireless power transfer.

3. The integrated circuit of claim 1, wherein the frequency signal is in the order of MHz.

4. The integrated circuit of claim 1, further comprising a sensing block configured to monitor at least one of the DC input, an associated current, or an associated impedance, and send feedback of at least one of the monitored DC input, associated current, or associated impedance to the boost controller, causing the boost controller to adjust the DC input.

5. The integrated circuit of claim 4, wherein the sensing block is configured to monitor cycle by cycle the DC input's current, and send feedback of the DC input's current to the boost controller, causing the boost controller to at least lower the DC input's current in response to the DC input's current exceeding a threshold.

6. The integrated circuit of claim 1, further comprising a digital block configured to disable the boost controller responsive to the DC input exceeding a threshold.

7. The integrated circuit of claim 1, further comprising a digital block coupled to the resonant circuit and configured to:
   detect a wireless power receiver magnetically coupled to the resonant circuit; and
   monitor a wireless power transfer between the resonant circuit and the wireless power receiver.

8. The integrated circuit of claim 1, further comprising an over temperature protection circuit configured to detect a thermal overload of the integrated circuit.

9. The integrated circuit of claim 1, further comprising an under-voltage lockout circuit configured to detect if a system input voltage is below a threshold.

10. A system for wireless power transfer, comprising:
    a boost controller configured to pump up a system input to a DC input;
    an oscillator configured to generate a frequency signal, wherein the oscillator is connected to an external resistor configured to adjust the frequency signal;
    a MOS (metal-oxide-semiconductor) driver coupled to the oscillator; and
    a power switch coupled to the MOS driver, wherein:
    the MOS driver is configured to receive the frequency signal and drive the power switch to convert, based on the frequency signal, the DC input to an AC input to a resonant circuit, and wherein the boost controller, the oscillator, and the MOS driver are assembled on an integrated circuit, and the resonant circuit is connected to the integrated circuit.

11. The system of claim 10, wherein the resonant circuit is wirelessly coupled to another resonant circuit for wireless power transfer.

12. The system of claim 10, wherein the frequency signal is in the order of MHz.

13. The system of claim 10, further comprising a sensing block configured to monitor at least one of the DC input, an associated current, or an associated impedance, and send feedback of at least one of the monitored DC input, associated current, or associated impedance to the boost controller, causing the boost controller to adjust the DC input.

14. The system of claim 13, wherein the sensing block is configured to monitor cycle by cycle the DC input's current, and send feedback of the DC input's current to the boost controller, causing the boost controller to at least lower the DC input's current in response to the DC input's current exceeding a threshold.

15. The system of claim 10, further comprising a digital block configured to disable the boost controller responsive to the DC input exceeding a threshold.

16. The system of claim 10, further comprising a digital block coupled to the resonant circuit and configured to:
    detect a wireless power receiver magnetically coupled to the resonant circuit; and
    monitor a wireless power transfer between the resonant circuit and the wireless power receiver.

17. The system of claim 10, further comprising an over temperature protection circuit configured to detect a thermal overload of the integrated circuit.

18. The system of claim 10, further comprising an under-voltage lockout circuit configured to detect if a system input voltage is below a threshold.

\* \* \* \* \*